Oct. 4, 1966  H. L. WEST ETAL  3,276,253

FILM APERTURE TESTER

Filed Nov. 20, 1963  2 Sheets-Sheet 1

HENRY L. WEST
ROBERT A. WOOD
INVENTORS

BY R. Frank Smith
David P. Ogden

ATTORNEYS

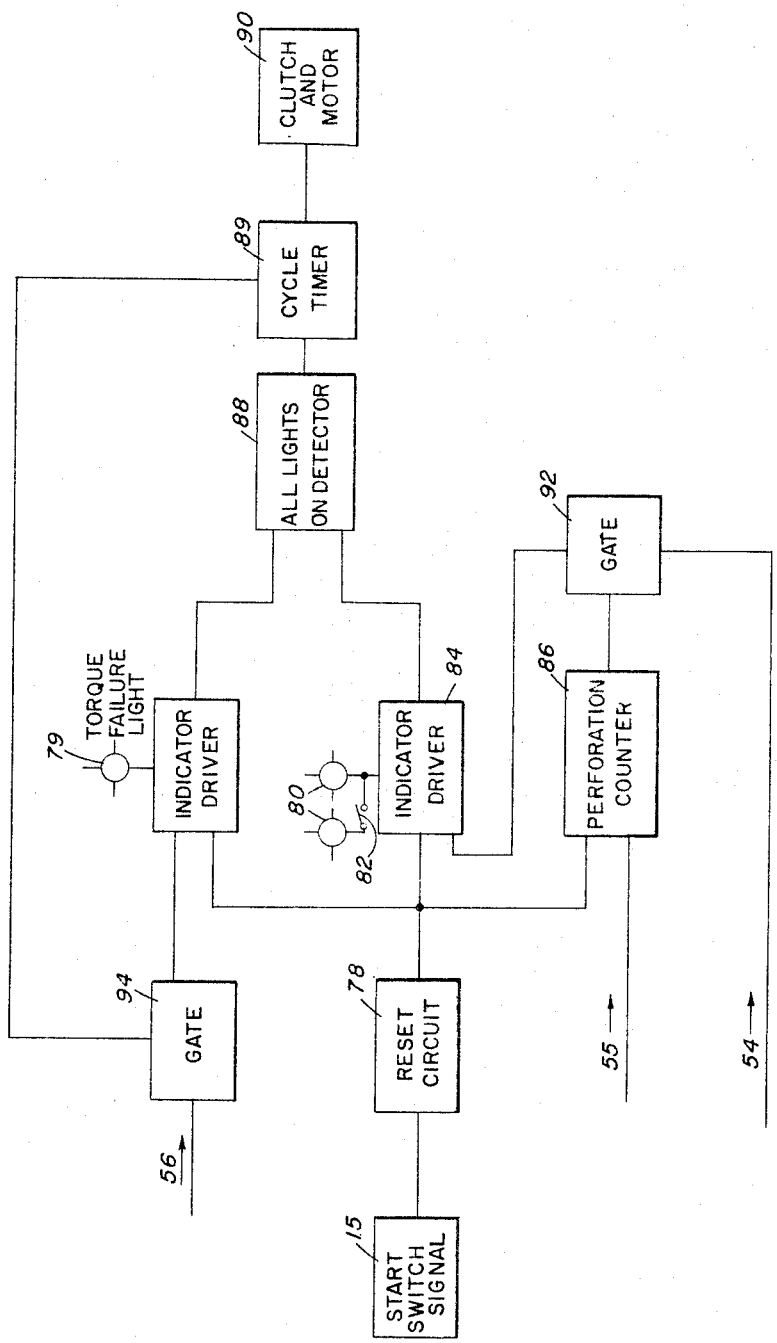

United States Patent Office 3,276,253
Patented Oct. 4, 1966

3,276,253
FILM APERTURE TESTER
Henry L. West and Robert A. Wood, Rochester, N.Y., assignors to Eastman Kodak Company, Rochester, N.Y., a corporation of New Jersey
Filed Nov. 20, 1963, Ser. No. 324,941
6 Claims. (Cl. 73—157)

This invention relates to a testing arrangement and, more particularly to an arrangement for testing acceptable operation of a film within a cassette.

In the art of manufacturing various complex equipments, it is a usual practice to test the equipment to determine operability at least of certain critical portions thereof. In the art of film manufacture, and more particularly in the art of preloaded film cassettes, wherein the film is provided with an indexing aperture, apertures are sensed within the camera to establish the location of the film during each exposure thereof. Moreover, the tolerances of the film manufacture must be carefully regulated and periodically inspected to assure acceptable relationship between the cassette, the film therein, and the control mechanisms of the type provided in the cameras adapted to use this film.

Therefore, an object of our invention is to provide a reliable film testing arrangement.

In accordance with one embodiment of our invention, a cassette is placed under the control of a film winding drive means whereby a feeler may sense each of the indexing control apertures in the film. The testing arrangement also provides separate means for detecting the presence of apertures which are to be sensed by the feeler, means for generating another signal when the feeler does not properly detect an aperture, and means for counting the apertures detected as well as the time duration of the entire testing sequence.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawings in which:

FIG. 5 is a block diagram illustrating suitable control circuitry.

Figure 1:
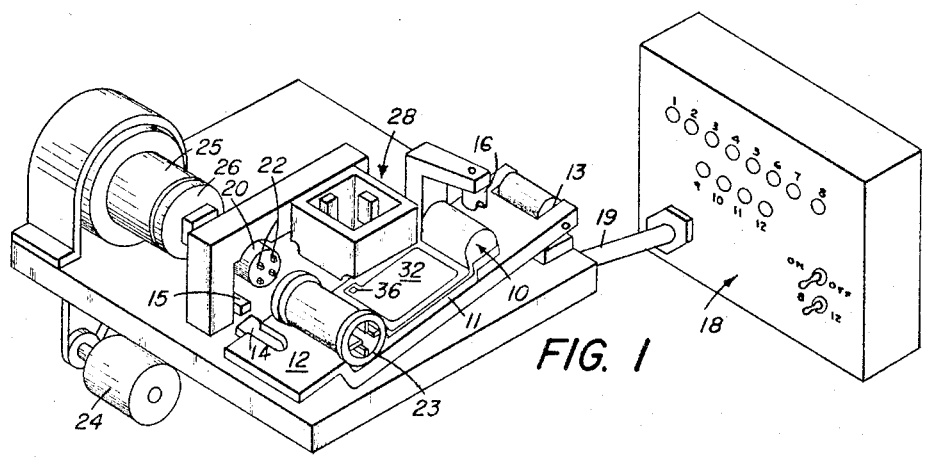
FIG. 1 is a perspective view of one embodiment of the present invention.

Referring now to the drawings, wherein like numbers refer to similar parts, during a test a cassette 10 is placed on a raisable platform 11. We prefer that starting of the test is simple and direct. Thus, to start, the platform 11 is raised by co-operation between a handle portion 12 and a pivot bearing 13 so that a striker plate 14 engages a starting button of a microswitch 15.

Usually, the microswitch position is adjusted so that the equipment may be operated only when the platform 11 is maintained in the testing position as by latch means shown as permanent magnetic latch 16. When the platform 11 is in the raised position, the signal developed by closing of the switch 15 is applied to an electronic equipment 18 by means of a cable 19. The electronic equipment 18 generates timing and indicating signals, as will be explained in more detail below.

An initial one of these signals releases a drive button 20 having a plurality of driving teeth 22. When released, the drive button 20 moves toward the cassette 10 to form a driving coupling with a film take-up spool 23 as shown more clearly in FIG. 4. A next signal initiates operation of a driving motor 24 which, by means of a pulley system, drives a permanent magnet portion 25 of a magnetic clutch having a face plate 26. This slipping type drive results in extension of completion of a test wherein a particular film binds or is otherwise delayed by malfunction. As explained in greater detail below, such delay provides a "Torque Failure" signal.

Figure 2:
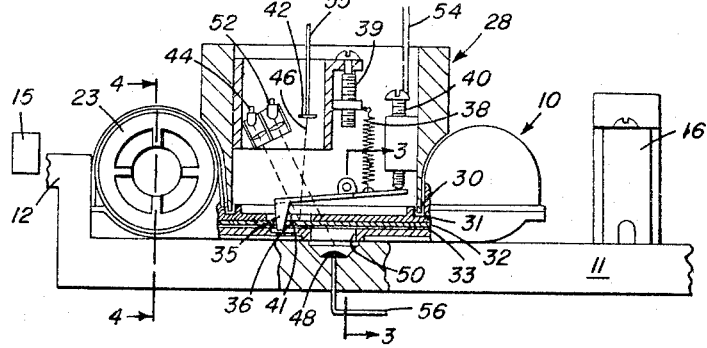
FIG. 2 is an elevation view partially in cross-section of a portion of the equipment shown in FIG. 1.

The testing location of the cassette 10 is selected so that a tapered box portion 28 resides partially within the cassette 10, as is shown more clearly in FIG. 2. The box 28 is substantially lighttight and constructed to substantially simulate a camera housing portion which locates precisely the cassette 10 when in use. Thus, the leading edges 30 of the box 28 reside in grooves 31 provided in the cassette 10. Such a relationship reduces light leaks and precisely determines the location of a strip of film 32 and a backing paper 33 which moves with the film 32 during operation of a film advance means.

During rotation of the drive button 20, the film is pulled onto the spool 23. As the film advances, to convey several frames of film thereby, a feeler 35 drops through the several apertures 36, one aperture being associated with each frame. In order to simulate usage conditions, the film 32 is driven past the feeler 35 at speeds of operation equivalent to those in a camera. Suitable actuation of the feeler 35 to engage each aperture 36 is facilitated by a spring 38 having its tension adjustable by a tension control means 39 such as a threaded screw member. The depth to which the feeler 35 must move prior to developing a signal is also controllable by a threaded contact member 40. It should also be noted that the feeler 35 is provided with a trailing ramp surface 41 to facilitate a self-camming action.

Since the backing paper 33 is normally black, and in the case under discussion is black, while the film is relatively reflective, a signal may be developed at a photocell 42 by light flux from a lamp 44 reflected by the film 32 during the periods when film is within the lower portion of box 28. In the region of traversal of the apertures the reflective level of the light flux to the photocell 42 is substantially decreased during the passage of an aperture 36 within the light flux path, as indicated in dashed lines at 46.

A second photocell 48 is provided in the region of a backing paper number window 50 in the back of the cassette 10 to detect the passage of film and backing paper from the region of the inspecting station. We have indicated a second lamp 52 for energizing this photocell 48. However, light from the lamp 44 could be utilized to provide the "completion-of-the-test signal." The signals developed at the test station, as discussed in connection with FIG. 2, are coupled by wires 54, 55 and 56, respectively, to the electronic equipment 18.

Figure 3:
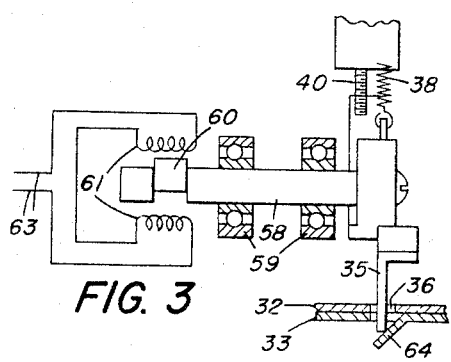
FIG. 3 is a cross-section view taken along the line 3—3 of FIG. 2.

Motion of the feeler 35 is also detectable by means other than the contactor 40. One simple arrangement for detecting the motion of the feeler is shown in FIG. 3, wherein the feeler support shaft 58 is rotatably supported in a pair of ball bearings 59 so that it normally will not vibrate or otherwise move except when the feeler 35 rotates during movement through an aperture 36. At a point remote from the feeler 35, the feeler shaft 58 drives an eccentric cam 60 within the field developed by a balanced coil arrangement 61 to change the flux of the system and thus generate an electric signal in the wires 63, which may be utilized to drive a cathode ray oscilloscope coupled to the electronic equipment 18. Usually, the eccentric cam 60 is eccentric only a few thousandths of an inch, whereby the shaft 58, along with the feeler 35 mounted thereon, may be precisely balanced to maintain a desired degree of accuracy.

The signal generated by the coil 61 and displayed on a cathode ray tube may also be permanently preserved on film and, if studied, will indicated even minute differences in action of the feeler 35 from hole to hole. It should be noted that because of stray light problems in connection with photosensitive film, the backing paper is provided with a self-closing flap 64, a portion of which will usually remain between the tip of the feeler 35 and the back of the cassette 10. The thickness of paper is compensated for by the adjustment of the adjustable contact member 40.

Figure 4:
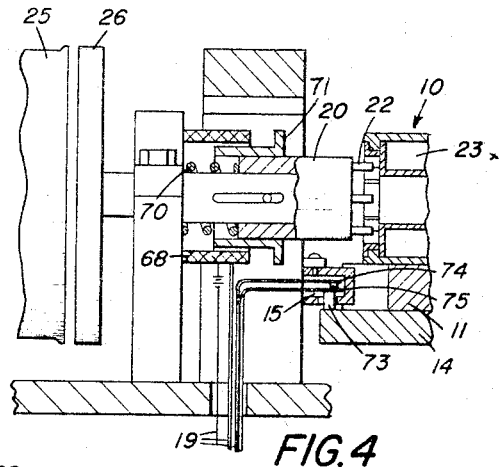
FIG. 4 is a cross-section view taken along the line 4—4 of FIG. 2.

Since the apertures 36 in the film 32 must be precisely located relative to the feeler 35, and since the spool 23 has a flange, the driving teeth 22 of the drive button 20 must be retracted when the cassette 10 is moved into place. A suitable means for retracting these teeth 22 is indicated in FIG. 4, wherein an electromagnetic coil 68 is normally energized by a signal passing through the cable 19 from the electronic equipment 18 to retract the button 20 against the bias of a spring 70. In order to provide fool-proof operation, we prefer to add to the button 20 a magnetizable sleeve 71 which is readily responsive to the magnetic flux developed by the coil 68.

During the test cycle, at such times as the striker plate 14 engages the microswitch 15, it drives the push button 73 upward to develop a coupling between the contact points 74 and 75 to energize the various circuit components of the electronic equipment 18. As may be expected from the above discussion, an important function of the electronic equipment 18 is to regulate the sequential relationship of the several parts discussed above, and otherwise establish a timing sequence.

Referring now to FIG. 5 wherein a block diagram is arranged to illustrate the several operating circuits and signals of the electronic equipment 18, the starter signal switch disclosed above has a microswitch 15 which energizes a reset circuit 78 to energize all error indicating lights, one being a torque failure lamp 79 providing the completion-of-test signal when extinguished and others being a group of signal lights 80 with the number of signal lights being selectable by a two-position toggle switch 82.

As shown in FIG. 1, the torque failure lamp 79 is on the lower portion of the front panel of electronic equipment 18 and the signal lights 80 are in two rows across the top of the front panel with a first row having eight lights corresponding to an eight-exposure film and the second row having four with both rows corresponding to a twelve-exposure film. Obviously, twenty or more exposure films may be tested by simply adding appropriate signal lights 80. As explained, the lights are each sequentially extinguished as the feeler 35 properly enters each aperture 36. The signal lights 80 are initially energized by an indicator driver circuit 84 (FIG. 5).

The reset circuit 78 also provides a signal to a perforation counter 86 to reset this counter to zero. If all lights are energized as required, a detector 88 is energized and initiates operation of a cycle timer 89. The clutch and motor drive indicated in block 90 of FIG. 5 are shown as parts 24, 25 and 26 in FIG. 1. The drive system starts advancing the film and paper through the tester in response to a signal from the cycle timer 89.

Each approaching aperture 36 of the film 32 develops a signal through the photocell 42 and is coupled by the wire 55 to cause a perforation counter 86 to advance one count. If the feeler 35 properly enters the aperture just sensed optically, the signal developed by the contact member 40 and applied to the wire 54 opens a gate circuit 92. This gate circuit 92 thereby allows the perforation counter signal to pass and cancel the error light associated with that particular perforation. Each of the respective perforation signal lights 80 is canceled in this manner during a "good" test. When a feeler signal is absent, the gate 92 remains closed and the cancel signal is not transmitted to that particular lamp. Those error lamps remaining on it at the end of a cycle indicate where feeler entry has not been properly made and thus indicate a "bad" test.

As the name implies, the cycle timer 89 terminates testing operations after a predetermined interval. This cycle timer 89 also serves to supply a signal to a gate circuit 94 that is arranged to pass a completion-of-test signal to turn off the torque failure light 79. This signal is generated in the wire 56 when the film and paper have wound completely through the cassette to energize the photocell 48 (FIG. 2.) If this occurs before the time duration alloted by the cycle timer 89, the lamp 79 is extinguished. If this does not so occur, the gate circuit 94 blocks the signal and the lamp 79 indicates this delayed completion condition. The particular circuits used within the apparatus of the electronic equipment 18 are relatively conventional and need not be explained in detail herein.

While we have shown and described particular embodiments of the present invention, other modifications may occur to those skilled in this art. We intend, therefore, to have the appended claims cover all modifications which fall within the true spirit and scope of our invention.

We claim:

1. A camera action tester for testing film motion in a cassette, the film having a frame indexing aperture, comprising:

starter switch means operable when the cassette is in a testing position;

a source of light positioned to direct light flux toward a path of expected traversal of each of the apertures;

light detector means responsive to passage of the aperture through the path to develop first signal information;

a feeler biased toward the film to enter each aperture of the film during a good test;

means for detecting entrance of said feeler into each aperture and developing second signal information; and electronic equipment initiated by said starter switch means for stopping the tester after a predetermined test run, and including means operable in the interim and responsive to the first and second signal information to indicate the timely movement of the aperture along the path.

2. A tester as in claim 1 wherein the depth of entry into each aperture must be a predetermined amount before the second signal information is of a magnitude which will stimulate said electronic equipment.

3. A tester as in claim 1 wherein a drive means of the film utilizes a slipping type clutch so that binding of the film increases the duration of a period to drive the film past the feeler; and said electronic equipment includes a completion-of-test timing signal indicative of excessive test duration.

4. A tester as in claim 1 having a tapered box provided with a flange guide means to prevent displacement of the cassette relative to said feeler.

5. A tester as in claim 1 having a drive button operable to rotate a take-up spool for winding thereon the film; and a slipping clutch means for driving said drive button whereby binding of the film delays completion of the test.

6. A tester as in claim 1 wherein said electronic equipment includes a delay signal means for displaying indication of excessive slipping of said clutch.

References Cited by the Examiner

UNITED STATES PATENTS

| | | | |
|---|---|---|---|
| 1,790,183 | 1/1931 | Weaver | 73—157 |
| 2,224,646 | 12/1940 | Friedman et al. | |
| 2,246,906 | 6/1941 | Viebahn et al. | 73—157 |

DAVID SCHONBERG, *Primary Examiner.*

LOUIS R. PRINCE, *Examiner.*

MICHAEL B. HEPPS, *Assistant Examiner.*

UNITED STATES PATENT OFFICE
CERTIFICATE OF CORRECTION

Patent No. 3,276,253

October 4, 1966

Henry L. West et al.

It is hereby certified that error appears in the above numbered patent requiring correction and that the said Letters Patent should read as corrected below.

Column 4, line 63, for the claim reference numeral "1" read -- 5 --.

Signed and sealed this 29th day of August 1967.

(SEAL)
Attest:

ERNEST W. SWIDER
Attesting Officer

EDWARD J. BRENNER
Commissioner of Patents